United States Patent
Yang et al.

(10) Patent No.: US 12,471,880 B2
(45) Date of Patent: Nov. 18, 2025

(54) ULTRASONIC IMAGING METHOD AND ULTRASONIC IMAGING SYSTEM

(71) Applicant: GE Precision Healthcare LLC, Wauwatosa, WI (US)

(72) Inventors: Jiajiu Yang, Wuxi (CN); Yao Ding, Wuxi (CN); Zhiqiang Jiang, Wuxi (CN); Hongjian Jiang, Wuxi (CN); Yi Wang, Wuxi (CN); Yuanyuan Chen, Wuxi (CN); Hujie Jiang, Wuxi (CN)

(73) Assignee: GE Precision Healthcare LLC, Wauwatosa, WI (US)

( * ) Notice: Subject to any disclaimer, the term of this patent is extended or adjusted under 35 U.S.C. 154(b) by 133 days.

(21) Appl. No.: 18/303,431

(22) Filed: Apr. 19, 2023

(65) Prior Publication Data

US 2023/0346335 A1 Nov. 2, 2023

(51) Int. Cl.
*A61B 8/08* (2006.01)
*A61B 8/00* (2006.01)

(52) U.S. Cl.
CPC .......... *A61B 8/0833* (2013.01); *A61B 8/463* (2013.01); *A61B 8/467* (2013.01)

(58) Field of Classification Search
CPC ....... A61B 8/0833; A61B 8/463; A61B 8/467; A61B 8/085; A61B 8/0883; A61B 8/0891; A61B 8/468; A61B 8/481; A61B 8/485; A61B 8/486; A61B 8/488; A61B 8/54; A61B 8/469; A61B 8/461

See application file for complete search history.

(56) References Cited

U.S. PATENT DOCUMENTS

| | | | |
|---|---|---|---|
| 7,376,252 B2 | 5/2008 | Gritzky | |
| 12,245,894 B2* | 3/2025 | Brenner | G06T 7/0012 |
| 2009/0005679 A1* | 1/2009 | Dala-Krishna | G06T 7/80 |
| | | | 600/437 |
| 2010/0195887 A1* | 8/2010 | Abe | G06T 7/246 |
| | | | 600/443 |
| 2014/0176561 A1* | 6/2014 | Nakamura | A61B 8/5246 |
| | | | 345/442 |
| 2017/0128035 A1* | 5/2017 | Miyaji | A61B 8/463 |
| 2020/0037983 A1* | 2/2020 | Poland | A61B 8/14 |
| 2021/0304482 A1* | 9/2021 | Park | G06T 13/00 |
| 2022/0385810 A1* | 12/2022 | Pan | H04N 23/698 |

FOREIGN PATENT DOCUMENTS

CN 101527047 B 2/2013

* cited by examiner

*Primary Examiner* — Alexei Bykhovski (57) ABSTRACT

Provided in the present application is an ultrasonic imaging method including generating an ultrasound image, determining an initial position of a tracking point of an area to be tracked in the ultrasound image, receiving a first tracking instruction from an input device, and automatically moving the tracking point along the boundary of the area to be tracked for the duration of the first tracking instruction to generate a trace line. Also provided in the present application are an ultrasonic imaging system and a non-transitory computer-readable medium.

18 Claims, 6 Drawing Sheets

ULTRASONIC IMAGING METHOD AND ULTRASONIC IMAGING SYSTEM

CROSS-REFERENCE TO RELATED APPLICATION

This application claims priority to Chinese patent application number 202210475672.2, filed on Apr. 29, 2022, the entirety of which is incorporated herein by reference.

FIELD OF THE INVENTION

The present application relates to the field of medical imaging and, in particular, to an ultrasonic imaging method and an ultrasonic imaging system.

BACKGROUND OF THE INVENTION

Ultrasonic imaging is a widely used imaging means. Ultrasound imaging uses real-time and non-invasive high-frequency sound waves that can carry out real-time imaging of organs as well as soft tissues in the human body.

The ultrasound images acquired by the real-time imaging have information that is important for clinical diagnosis, such as the dimensions of the organ of interest, the size of a lesion, or other information. To obtain this information, the user usually needs to track the area of interest in the ultrasound image by depicting a trace line. Tracking as an intermediate means can further help the user to obtain the above information.

In the conventional tracking method, the user depicts the trace line with an input device (e.g., a touch ball) and adjusts the trace line to move along the boundary of the area of interest by continuously adjusting the direction inputted by the input device to ultimately obtain a complete tracking trace line. The described process consumes a great amount of time. Moreover, in the case of unskilled operators or areas of interest with irregularly-shaped boundaries, the manual trace line depiction would not be very accurate. Fully automated trace line tracking generates a trace line by automatically identifying the boundary of the area of interest, but when the results are not satisfactory to the user, the automatically-generated trace line is difficult to adjust, and the problems of being time-consuming and of low accuracy are still difficult to solve.

BRIEF DESCRIPTION OF THE INVENTION

The aforementioned deficiencies, disadvantages, and problems are solved herein, and these problems and solutions will be understood through reading and understanding of the following description.

Provided in some embodiments of the present application is an ultrasonic imaging method, comprising: generating an ultrasound image; determining an initial position of a tracking point of an area to be tracked in the ultrasound image; receiving a first tracking instruction from an input device; and automatically moving the tracking point along the boundary of the area to be tracked for the duration of the first tracking instruction to generate a trace line.

Provided in some embodiments of the present application is an ultrasonic imaging system, comprising: a probe, configured to acquire a signal for generating an ultrasound image; an input device, configured to be operated to generate an instruction; a processor, configured to generate the ultrasound image, determine an initial position of a tracking point of an area to be tracked in the ultrasound image, receive a first tracking instruction from the input device, and automatically move the tracking point along the boundary of the area to be tracked for the duration of the first tracking instruction to generate a trace line; and a display apparatus, configured to receive a signal from the processor for display.

Provided in some of the embodiments of the present application is a non-transitory computer-readable medium, wherein the non-transitory computer-readable medium stores a computer program, the computer program having at least one code segment which is executable by a machine to cause an ultrasonic imaging system to perform the steps of: generating an ultrasound image; determining an initial position of a tracking point of an area to be tracked in the ultrasound image; receiving a first tracking instruction from an input device; and automatically moving the tracking point along the boundary of the area to be tracked for the duration of the first tracking instruction to generate a trace line.

It should be understood that the brief description above is provided to introduce, in simplified form, some concepts that will be further described in the detailed description. The brief description above is not meant to identify key or essential features of the claimed subject matter. The scope is defined uniquely by the claims that follow the detailed description. Furthermore, the claimed subject matter is not limited to implementations that solve any disadvantages noted above or in any section of the present disclosure.

BRIEF DESCRIPTION OF THE DRAWINGS

The present application will be better understood by reading the following description of non-limiting embodiments with reference to the accompanying drawings, wherein.

DETAILED DESCRIPTION OF THE INVENTION

Specific implementations of the present application will be described below. It should be noted that in the specific description of these embodiments, for the sake of brevity and conciseness, the present application may not describe all features of the actual implementations in detail. It should be understood that in the actual implementation process of any implementations, just as in the process of any engineering project or design project, a variety of specific decisions are often made to achieve specific goals of the developer and to meet system-related or business-related constraints, which may also vary from one implementation to another. Furthermore, it should also be understood that although efforts made in such development processes may be complex and tedious, for those of ordinary skill in the art related to the content disclosed in the present application, some design, manufacture or production changes based on the technical content disclosed in the present disclosure are only common technical means, and should not be construed as insufficient content of the present disclosure.

Unless otherwise defined, the technical or scientific terms used in the claims and the description are as they are usually understood by those of ordinary skill in the art to which the present invention pertains. "First," "second," and similar words used in the present application and the claims do not denote any order, quantity, or importance, but are merely intended to distinguish between different constituents. The terms "one" or "a/an" and similar terms do not denote a limitation of quantity, but rather the presence of at least one. The terms "include" or "comprise" and similar terms mean that an element or article preceding the term "include" or "comprise" encompasses elements or articles and their equivalent elements listed after "include" or "comprise," and does not exclude other elements or articles. The terms "connect" or "connected" and similar words are not limited to physical or mechanical connections, and are not limited to direct or indirect connections.

Figure 1:
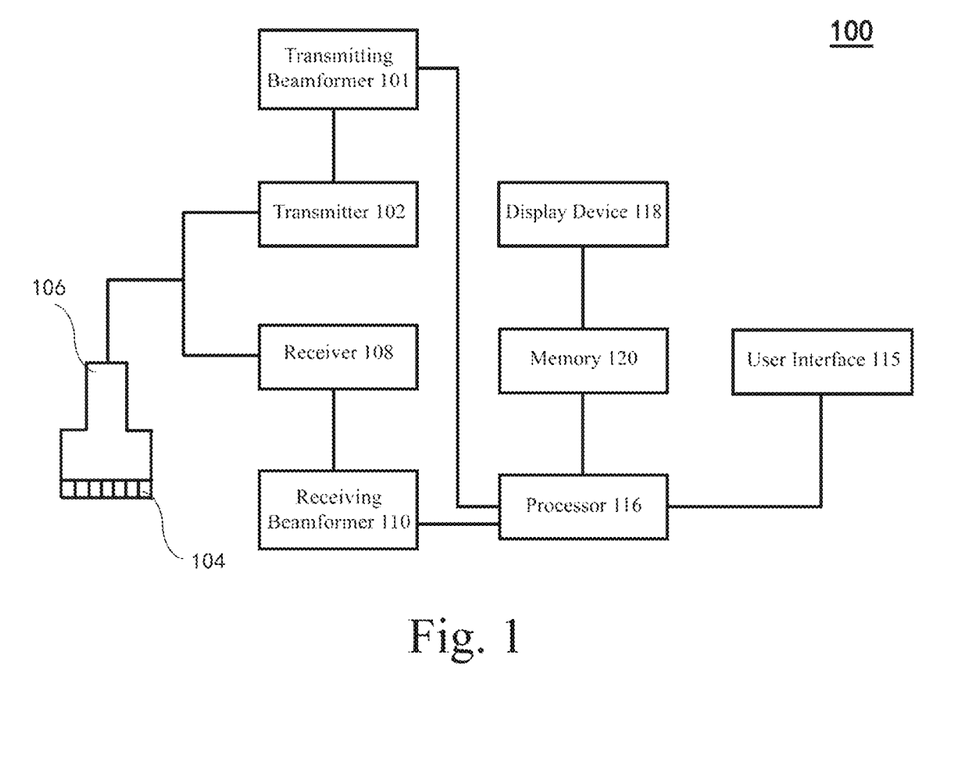
FIG. 1 is a schematic diagram of an ultrasonic imaging system according to some embodiments of the present application.

FIG. 1 is a schematic diagram of an ultrasonic imaging system 100 according to some embodiments of the present application. The ultrasonic imaging system 100 includes a transmit beamformer 101 and a transmitter 102, which drive elements 104 within a probe 106 to transmit ultrasonic pulse signals into the body (not shown). According to various embodiments, the probe 106 may be any type of probe, including a linear probe, a curved array probe, a 1.25D array probe, a 1.5D array probe, a 1.75D array probe, or a 2D array probe. According to other embodiments, the probe 106 may also be a mechanical probe, for example, a mechanical 4D probe or a hybrid probe. The probe 106 may be configured to acquire 4D ultrasonic data, and the 4D ultrasonic data includes information related to how volume changes over time. Each volume may include a plurality of 2D images or slices. Still referring to FIG. 1, the ultrasonic pulse signals are backscattered from structures in the body (e.g., blood cells or muscle tissue) to produce echoes that return to the elements 104. The echoes are converted by the elements 104 into electrical signals or ultrasonic data, and the electrical signals are received by a receiver 108. The electrical signals representing the received echoes pass through a receive beamformer 110 that outputs ultrasonic data. According to some embodiments, the probe 106 may include an electronic circuit to perform all of or part of transmit beamforming and/or receive beamforming. For example, all or part of the transmit beamformer 101, the transmitter 102, the receiver 108, and the receive beamformer 110 may be located in the probe 106. The term "scan" or "scanning" may also be used in the present disclosure to refer to acquiring data through the process of transmitting and receiving ultrasonic signals. The terms "data" and "ultrasonic data" may be used in the present disclosure to refer to one or a plurality of datasets acquired using the ultrasonic imaging system. A user interface 115 may be configured to control operation of the ultrasonic imaging system 100. The user interface may be configured to control input of patient data, or select various modes, operations, parameters, and so on. The user interface 115 may include one or more input devices, such as a keyboard, touch screen, trackball, or any other user input apparatuses.

The ultrasonic imaging system 100 further includes a processor 116, which controls the transmit beamformer 101, the transmitter 102, the receiver 108, and the receive beamformer 110. According to various embodiments, the receive beamformer 110 may be a conventional hardware beamformer or software beamformer. If the receive beamformer 110 is a software beamformer, then the receive beamformer may include one or a plurality of the following components: a graphics processing unit (GPU), a microprocessor, a central processing unit (CPU), a digital signal processor (DSP), or any other type of processor capable of performing logical operations. The beamformer 110 may be configured to implement conventional beamforming techniques and techniques such as retrospective transmit beamforming (RTB).

The processor 116 is in electronic communication with the probe 106. The processor 116 may control the probe 106 to acquire ultrasonic data. The processor 116 controls which elements 104 are activated and the shape of a beam transmitted from the probe 106. The processor 116 is further in electronic communication with a display apparatus 118, and the processor 116 may process the ultrasonic data into an image for display on the display apparatus 118. For the purpose of the present disclosure, the term "electronic communication" may be defined to include wired connection and wireless connection. According to an embodiment, the processor 116 may include a central processing unit (CPU). According to other embodiments, the processor 116 may include other electronic components capable of performing processing functions, for example, a digital signal processor, a field-programmable gate array (FPGA), a graphics processing unit (GPU), or any other type of processor. According to other embodiments, the processor 116 may include a plurality of electronic components capable of performing processing functions. For example, the processor 116 may include two or more electronic components selected from a list including the following electronic components: a central processing unit (CPU), a digital signal processor (DSP), a field-programmable gate array (FPGA), and a graphics processing unit (GPU). According to another embodiment, the processor 116 may include a complex demodulator (not shown), which demodulates RF data and generates raw data. In another embodiment, the demodulation may be performed earlier in the processing chain. The processor 116 may be adapted to perform one or a plurality of processing operations on data according to a plurality of selectable ultrasound modalities. As echo signals are received, data may be processed in real time in a scanning stage. For the purpose of the present disclosure, the term "real time" is defined to include a process that is performed without any intentional delay. The real-time frame or volume rate may vary on the basis of the site where data is acquired or the size of the volume and specific parameters used in the acquisition process. The data may be temporarily stored in a buffer (not shown) in the scanning stage, and processed in a less real-time manner in live or offline operations. Some embodiments of the present application may include a plurality of processors (not shown) to cope with processing tasks. For example, a first processor may be configured to demodulate and decimate RF signals, while a second processor may be configured to further process data which is then displayed as an image. It should be recognized that other embodiments may use different processor arrangements. For embodiments where the receive beamformer 110 is a software beamformer, the aforementioned processing tasks belonging to the processor 116 and the software beamformer herein may be performed by a single processor, for example, the receive beamformer 110 or the processor 116. Alternatively, the processing functions belonging to the processor 116 and the software beamformer may be distributed among any number of separate processing components in a different manner.

According to an embodiment, the ultrasonic imaging system 100 may continuously acquire ultrasonic data at a frame rate of, for example, 10 Hz to 30 Hz. An image generated from the data may be refreshed at a similar frame rate. Data may be acquired and displayed at different rates in other embodiments. For example, depending on the size of the volume and potential applications, ultrasonic data may be acquired at a frame rate of less than 10 Hz or greater than 30 Hz in some embodiments. For example, many applications involve acquiring ultrasonic data at a frame rate of 50 Hz. A memory 120 is included therein to store processing frames for acquiring data. In an exemplary embodiment, the memory 120 has sufficient capacity to store ultrasonic data frames which are acquired over a period of time and are at least a few seconds long. The data frames are stored in a manner that facilitates retrieval according to the order or time of acquisition thereof. The memory 120 may include any known data storage medium.

Optionally, the embodiments of the present application may be carried out using a contrast agent. When an ultrasound contrast agent including microbubbles is used, enhanced images of anatomical structures and blood flow in the body are generated by contrast imaging. After acquiring data using the contrast agent, image analysis includes: separating a harmonic component from a linear component, enhancing the harmonic component, and generating an ultrasonic image by using the enhanced harmonic component. Separation of the harmonic component from the received signal is performed using an appropriate filter. The use of a contrast agent in ultrasonic imaging is well known to those skilled in the art, and therefore is not described in further detail.

In various embodiments of the present application, data may be processed by the processor 116 by means of modules of other or different related modes (e.g., B-mode, color Doppler, M-mode, color M-mode, spectral Doppler, elastography, TVI, strain, strain rate, etc.) to form 2D or 3D images. For example, one or a plurality of modules may generate B-mode, color Doppler, M-mode, color M-mode, spectral Doppler, elastography, TVI, strain, strain rate, a combination thereof, etc. Image bundles and/or frames are stored, and timing information indicating the time when data is acquired in the memory may be recorded. The module may include, for example, a scan conversion module that performs scan conversion operations to convert image frames from a coordinate bundle space to display space coordinates. A video processor module may be provided that reads image frames from the memory and displays the image frames in real time while performing an operation on a patient. The video processor module may store image frames in an image memory, read images from the image memory, and display the images. The ultrasonic imaging system 100 may be a console-based system, a laptop computer, a handheld or portable system, or any other configuration.

Figure 2:
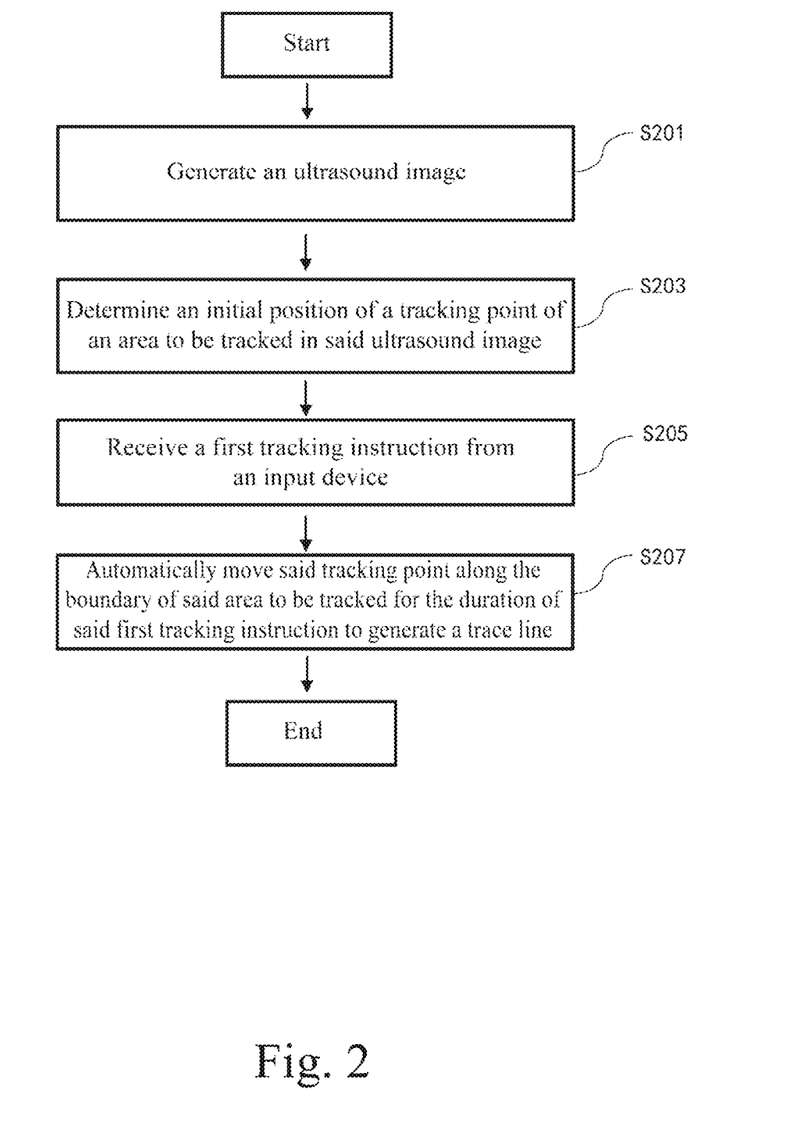
FIG. 2 is a flowchart of an ultrasonic imaging method according to some embodiments of the present application.

FIG. 2 is a flowchart of an ultrasonic imaging method 200 according to some embodiments of the present application. Various modules in the flowchart represent steps that can be performed according to the method 200. Additional embodiments may perform the illustrated steps in a different order, and/or additional embodiments may include additional steps not shown in FIG. 2.

FIG. 2 is described in further detail below according to an exemplary embodiment. The method may be performed by the ultrasonic imaging system 100 shown in FIG. 1. For example, the method may be performed by the processor 116 in the ultrasonic imaging system 100. Or alternatively, the method can be performed by any other ultrasonic imaging system.

In step S201, an ultrasound image is generated. The process of generating the ultrasound image may be implemented by the processor 116. For example, the processor 116 may obtain from the probe 106 ultrasonic data acquired from a body part of a person to be scanned. Generally, ultrasonic signals may be sent by the probe 106 to the tissue to be imaged, and then ultrasonic echo signals from the tissue to be imaged are received by the probe 106. The processor 116 then can obtain ultrasonic data about the tissue to be imaged. The tissue to be imaged may be any human/animal tissue or organ. For example, the tissue to be imaged may be a blood vessel, a liver, a kidney, a heart, a carotid artery, a breast, or the like. Alternatively, the tissue to be imaged may be a lesion, such as a tumor, carotid plaque, etc. Further, the processor 116 processes the ultrasonic data to generate an ultrasound image. It should be understood that the ultrasound image may be a two-dimensional ultrasound image, a color Doppler image, a pulsed Doppler image or any type in the art.

In step S203, an initial position of a tracking point of an area to be tracked in the ultrasound image is determined. The process may be implemented by the processor 116.

The area to be tracked can be determined by a variety of means. In some embodiments, the area to be tracked can be customized by the user. For example, an area of interest may be selected by the user through their own observation, and the processor determines, on the basis of the area of interest, the area to be tracked. In other embodiments, the area to be tracked may be determined through automatic identification by the processor 116. For example, the processor 116 may determine, on the basis of image recognition techniques, anatomical structures in the ultrasound image and identify these anatomical structures as areas to be tracked. The image recognition techniques may be any such techniques in the art. For example, an image analysis algorithm may be defined by one or more machine learning algorithms to identify anatomical structures of interest on the basis of one or more anatomical markers within a medical image (e.g., boundaries, thickness, pixel value changes, valves, lumens, chambers, edges or inner layers, vascular structures, etc.), modalities or patterns of medical images (e.g., colored blood flow), etc. The one or more anatomical markers may represent features of pixels and/or volume elements of the medical image, such as a histogram of oriented gradients, point features, covariance features, binary mode features, and the like. For example, anatomical markers may represent anatomical features and/or structures of anatomical structures of interest, fiducial markers, and the like. Through the automatic identification, the processor 116 can automatically determine the anatomical structures of interest in the ultrasound image, for example, one or more of the liver, kidney, heart, blood vessels, tumor, etc. The processor 116 may further use the above automatically identified anatomical structures as the area to be tracked. In addition, when multiple anatomical structures of interest to be selected are identified in the same ultrasound image, the operation of selection can be carried out by the user. For example, the processor can simultaneously display and mark all the identified anatomical structures for the user to select. The user inputs selection instructions through operating an input device such as a trackball, keyboard or touch screen, and the processor receives the selection instructions to determine the area to be tracked.

The means for determining the initial position of the tracking point in a previously determined area to be tracked can be equally diverse. In some embodiments, the user can make their own selection. For example, the user can move the position of a cursor on the display apparatus 118 by using an input device such as a touch pad, trackball, etc., until the cursor moves to the initial position of the tracking point as selected by the user. In addition, the user can make selections directly by controlling the touch screen display, for example, by performing a tapping operation.

In other embodiments, the determination of the initial position of the tracking point may likewise be automated by the processor 116. For example, the processor 116 may automatically identify a high confidence area within the boundary of the area to be tracked, and the initial position of the tracking point may be selected on the basis of the high confidence area. Specifically, the processor 116 may determine the boundaries of the anatomical structures and evaluate the reliability of the determination results, while using the automatically identified anatomical structures as the area to be tracked as described above. The scoring criteria may be diverse. For example, an evaluation may be carried out by means of one or more machine learning models such as a deep learning network. The model can be used to determine the level of image quality at the boundary of the area to be tracked. Boundaries having a high level of image quality will be considered as having a high confidence level, and boundaries having a low level of image quality will be considered as having a low confidence level. Accordingly, the processor 116 may automatically determine the initial position of the tracking point, and the determined position is displayed by the display apparatus 118. It should be understood that the determination of the initial position of the tracking point can also be performed by other means. For example, the magnitude of the difference between the brightness (intensity) of each pixel on the boundary of the area to be tracked and the brightness of adjacent pixels inside and outside the boundary can be calculated, respectively. High confidence is assigned to the boundary regions with larger differences and low confidence is assigned to the boundary regions with smaller differences. Examples are not exhaustively enumerated herein.

In step S205, a first tracking instruction is received from the input device. The foregoing process may be implemented by the processor 116. The input device may be any one or more of the devices described above in the present application. The generation of the first tracking instruction may be based on user operations. In a non-limiting embodiment, the user may do so by toggling the trackball, e.g., the user may toggle the trackball in a certain direction (e.g., toward the right) to generate the first tracking instruction. The first tracking instruction is received by the processor. In addition, the first tracking instruction can be generated by means of the user swiping a trackpad or touch screen in a certain direction, and the first tracking instruction is received by the processor. It should be understood, other instruction generation methods are also allowed.

Further, in some embodiments of the present application, the first tracking instruction is generated by the input device when being operated within a first directional range. For example, the first direction can be any of the up, down, left, or right scrolling directions of a touch ball. Accordingly, the first directional range may be a certain range of permissible deviations in any of the above four directions, for example, a range of ±30°. Alternatively, the first direction can be in any of the up, down, left, or right swiping directions of the touchpad or touch screen. Accordingly, the first directional range may be a certain range of permissible deviations in any of the above four directions, for example, a range of ±30°. The foregoing configuration allows the user to operate the input device without deliberately maintaining a precise input direction, but permits a certain range of deviation, thereby reducing the probability of user misoperation and improving input efficiency.

In step S207, the tracking point is automatically moved along the boundary of the area to be tracked for the duration of the first tracking instruction to generate a trace line. This process may be implemented by the processor 116.

In embodiments of the present application, the first tracking instruction may be dependent on input on a continuous basis from the user by means of the input device. For example, the user continuously toggles the trackball, or continuously swipes one of the trackpad or touch screen. The processor 116 automatically controls the tracking point for the duration of the first tracking instruction to automatically move the tracking point along the boundary of the area to be tracked and generate the trace line. In this way, continuous input from the user by means of the input device will cause the tracking point to move forward along the boundary and create a new tracking trace line.

It should be noted that the movement of the tracking point along the area to be tracked can be achieved by the processor 116 on the basis of the automatic identification of the boundary by any of the means as described above (e.g., deep learning models or algorithmic models). The foregoing process has been described in detail above and will not be repeated herein. Of course, the method for identifying the boundary can be achieved by any other means in the prior art.

The processor 116 may further control the tracking point to continue moving forward along the boundary where the tracking point is located and generate the trace line. The boundary identification process can either be carried out simultaneously during the movement of the tracking point or preformed in any of the above steps in advance. The identification process may be carried out one or more times. For example, updates may be carried out in real time by means of multiple boundary identifications and selecting the identification results having high confidence levels.

It should be understood that the duration of the first tracking instruction and the movement time of the tracking point can be as consistent as possible at all times. In this way, the user can obtain instant feedback on their operations. However, in some scenarios, a delay or discrepancy between the start/stop time of the tracking point movement and the start/stop time of the instruction is allowed.

In this way, the user does not need to manually depict the boundary of the area to be tracked with the input device. That is, the first tracking instruction of the input device does not need to be consistent in direction with the boundary of the area to be tracked. The first tracking instruction will only represent a "moving forward" instruction to the tracking point. On the basis of the instruction, the processor then controls the tracking point to depict and generate the trace line according to the automatically-identified boundary. Thus, the efficiency of user input can be greatly improved. At the same time, the above approach of the present application retains a greater degree of user operability when compared with fully automated boundary identification and generation. In some special scenarios, for example, when the structure of the area to be tracked is complex and there is serious interference, the user can choose whether to abort the tracking instruction so as to avoid the unreliability of machine recognition according to the actual requirements.

The efficiency and reliability of tracking can be significantly improved by means of any of the above embodiments of the present application.

The following is a more detailed exemplary description of the embodiments of the present application with specific application scenarios.

Figure 3:
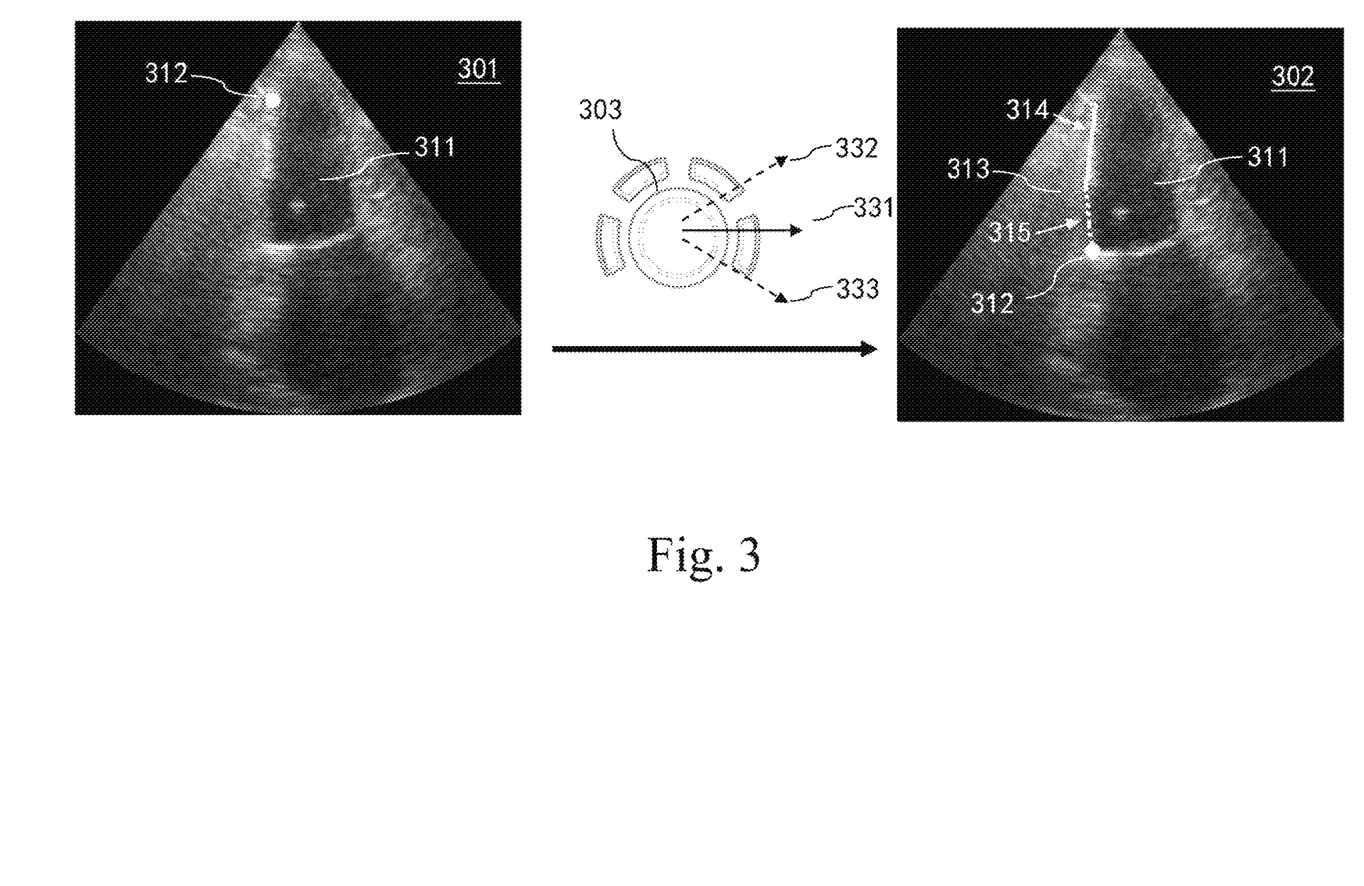
FIG. 3 is a schematic diagram for tracking an ultrasound image according to some embodiments of the present application.

Firstly, referring to FIG. 3, a schematic diagram of tracking an ultrasound image according to some embodiments of the present application is shown. Note that the input device in the figure is illustrated exemplarily with the trackball 303, but under the teachings of the present application, the above input device may also be any as described in the present application and in the art.

As shown in FIG. 3, the ultrasound image 301 includes the area to be tracked 311. As an example, the area to be tracked 311 can be a particular anatomical structure of the heart (e.g., the left ventricle). The ultrasound image 301 may be generated in the manner as aforementioned in the present application and will not be repeated herein.

Further, the initial position of the tracking point 312 of the area to be tracked 311 in the ultrasound image 301 is determined. The determination means may be an automatic determination by the processor, for example, by selecting a boundary having a high confidence level for automatic placement of the tracking point 312, or a user may move and adjust the tracking point by operating the trackball 302. In some embodiments, the automatically-set tracking point 312 can likewise be adjusted on the basis of the input from the input device. For example, the processor can determine and generate a tracking point in advance, and the user can decide whether to adjust the position of the tracking point until a suitable initial position of the tracking point 312 is found. The tracking point 312 can be a shape and/or color that facilitates user observation. For example, a circular tracking point 312 can be selected to be superimposed on the corresponding boundary. In addition, the parameters of the tracking point 312 can be customized by the user, which will not be repeated herein.

When the initial position of the tracking point 312 is determined, the user can operate to depict the trace line. Referring to the ultrasound image 302 of FIG. 3, an example ultrasound image is shown with a trace line generated after the first tracking instruction has been continued for a certain period of time. As described above, the first tracking instruction may come from an input device such as the trackball 303. Specifically, the trace line is generated by the trackball 303 which is operated by the user in the first direction 331 (e.g., a rightward direction as illustrated in the figure). As the user continues to operate the trackball 303, the processor will continue to receive the first tracking instruction to control the tracking point 312 to move along the automatically-determined boundary of the area to be tracked 311. For example, as shown in FIG. 3, the tracking point 312 moves generally downward and counterclockwise along the boundary, thereby generating the trace line 313. In this way, the user does not need to adjust the direction when operating the trackball 303 (or other input device) in accordance with changes in the direction of the boundary of the area to be tracked 311, but only needs to continuously operate the input device in generally one direction.

As can be seen in FIG. 3, the direction in which the input device is operated (first direction 331), and the direction in which the tracking point 312 moves (trace line 313 generation direction) do not need to correspond substantially. That is, the direction in which the input device is operated actually controls the advancement of the tracking point. The foregoing configuration saves the user's operation time and reduces the complexity of the user's operation.

In some embodiments, the first direction 331 is allowed to deviate within a certain range in order to improve the efficiency of user input. For example, the first directional range may be any direction within the range of the angle from direction 332 to direction 333; in the example of FIG. 3, that is a deviation above and below the straight right direction 331 by a certain degree. The foregoing configuration means can effectively reduce the user's operational complexity, thereby improving tracking efficiency. The first direction 331 and first directional range 332-333 are only exemplary descriptions, which may be in any of the leftward, upward, downward or other directions. The direction and directional range can be determined by a means that is either set by default according to the ultrasound imaging system or can be customized by the user on the basis of their usage habits. Similarly, the direction of motion of the tracking point 312 from the initial position along the boundary can be set by default or customized.

Further, in some examples of the present application, the trace line 313 may also be configured to visually indicate the confidence level of the corresponding boundary. The confidence level determination method for automatic boundary identification can be any method in the art or as described above in the present application, which will not be repeated herein. Further, the confidence level determined by the automatic detection can be directly displayed through the visual changes of trace line 313. A trace line segment 314 corresponding to a high confidence boundary can be displayed in a first visual form (e.g., a solid line). The trace line segment 315 corresponding to a low confidence boundary can be displayed in a second visual form (e.g., a dashed line).

The foregoing configuration means allows the user to determine at a glance the reliability of the boundary trace line automatically generated by the processor and to make decisions as to whether to carry out human interventions, thereby increasing the tracking accuracy. It should be noted that the distinction by dashed lines and solid lines is only an exemplary description, and any other type of visual indication is also permitted, without further exhaustive listing. In addition, it should also be noted that the visual indication is not necessarily required and those skilled in the art can track without evaluating the confidence level.

Figure 4:
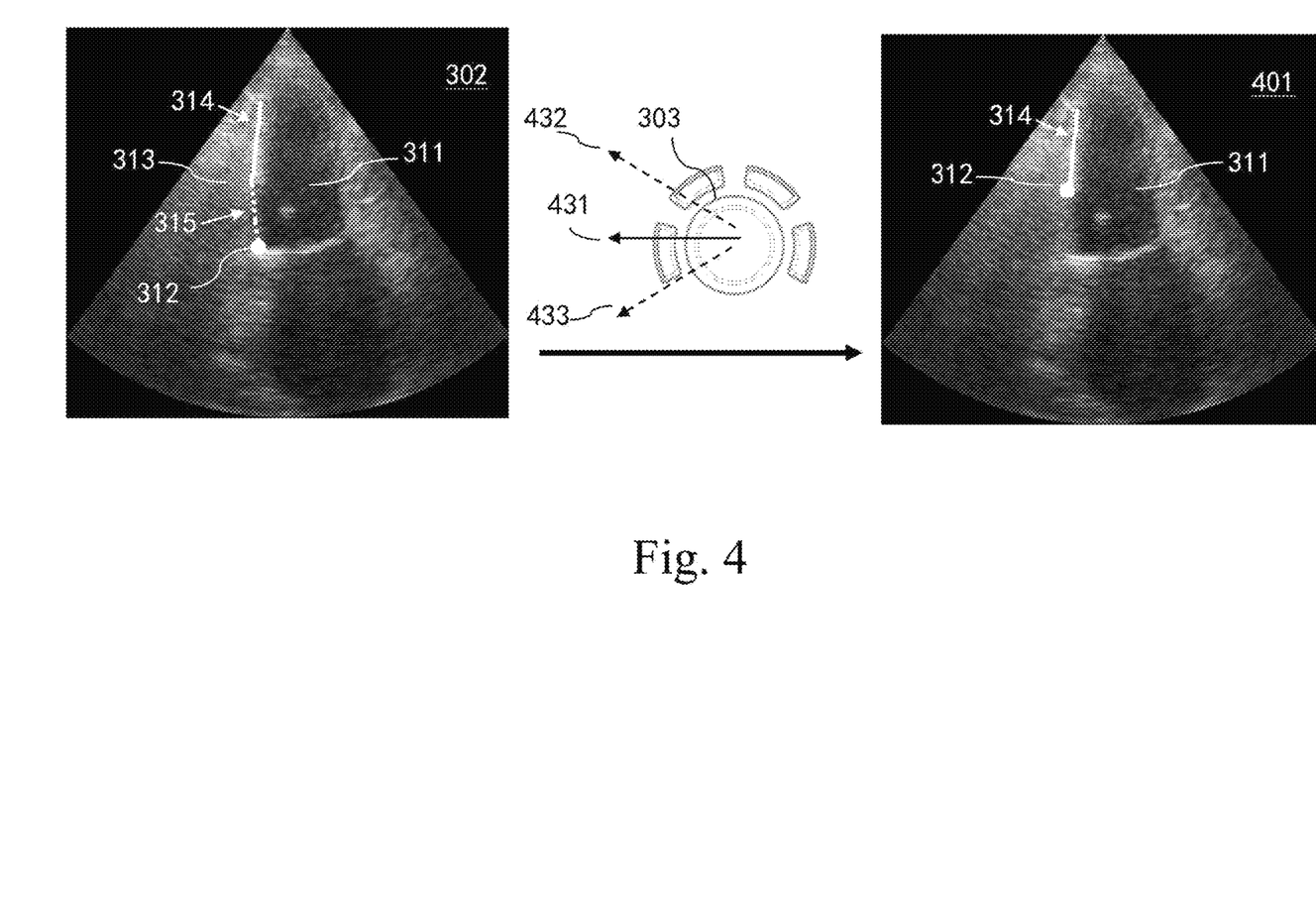
FIG. 4 is a schematic diagram for eliminating a generated trace line from an ultrasound image according to some embodiments of the present application.

Optionally, the present application also provides embodiments for eliminating a generated trace line. Referring to FIG. 4, a schematic illustration of the elimination of a generated trace line from an ultrasound image according to some embodiments of the present application is shown.

When the trace line 313 that has been generated in the ultrasound image 302 is not satisfactory, the processor may be configured to perform elimination of at least a portion of the trace line 313. The processor may receive a second tracking instruction from the input device. Further, the processor may automatically move the tracking point along the generated trace line for the duration of the second tracking instruction to eliminate at least a portion of the trace line. For the means for generating the second tracking instruction of the input device and the means for moving the tracking point, the description of the first tracking instruction above in the present application may be used as a reference.

The generation of trace line 313 in FIG. 4 can be carried out as described in FIG. 3 and the corresponding text section, which will not be repeated herein. When the user identifies a portion of the trace line 315 having a low confidence level exists in the trace line 313 in the ultrasound image 302, the user can operate to perform a trace line elimination. Referring to the ultrasound image 302 of FIG. 3, an example ultrasound image 401 is shown with a portion of the trace line eliminated after the second tracking instruction has been continued for a certain period of time. The second tracking instruction may come from an input device such as the trackball 303. Specifically, the trace line is eliminated by the trackball 303 which is operated by the user in the second direction 431 (e.g., a leftward direction as illustrated in the figure). As the user continues to operate the trackball 303, the processor will continue to receive the second tracking instruction to control the movement of the tracking point 312 along the automatically-determined trace line that has been generated. In the example of FIG. 4, the tracking point 312 moves generally upward and clockwise along the boundary to eliminate the trace line. During this process, the user only needs to continuously operate the input device generally in one direction.

The direction in which the input device is operated (second direction 431) and the direction in which the tracking point 312 moves (trace line 313 elimination direction) do not need to correspond substantially. In this way, the trace line elimination is equally simple and efficient. Note that the aforementioned partial elimination of a trace line does not only apply to a trace line automatically determined and generated by the processor, but also to a trace line added manually by the user.

The second direction 431 can be allowed to deviate within a certain range. For example, the second directional range may be any direction within the range of the angle from direction 432 to direction 433. In the example of FIG. 4, that is, a deviation above and below the straight left direction 431 by a certain degree. The foregoing configuration means can effectively reduce the user's operational complexity, thereby improving tracking efficiency. The second direction 431 and second directional range 432-433 are only exemplary descriptions, which may be in any of the rightward, downward, upward, or other directions. The direction and directional range can be determined by a means that is either set by default according to the ultrasound imaging system or can be customized by the user on the basis of their usage habits.

In addition, taking into account the user's usage habits and the consistency of operation, in the example of the present application, the first directional range is configured at least partially opposite to the second directional range, and the first directional range and the second directional range do not overlap. Descriptions are provided with reference to both FIG. 3 and FIG. 4. The first directional range 332-333 and the second directional range 432-433 are configured to be at least partially opposite to each other. For example, the first directional range 332-333 is a certain angular range toward the right, and the second directional range 432-433 is a certain angular range toward the left. In this way, the user can operate the input apparatus in the first directional range when they wish to move the tracking point 312 forward, and likewise operate the input apparatus in the opposite direction (i.e., the second directional range) when they need to go back in the opposite direction. The foregoing configuration is more in line with the user's usage habits, making the user's operation simple and smooth. Further, there is no overlap between the first directional range and the second directional range, thereby avoiding the user's misoperation in a certain directional range.

As described above in the present application, in some scenarios, the boundary of the area to be tracked may be more complex, in which case it is difficult for automatic boundary identification and tracking to achieve a satisfactory confidence level and accuracy. An improvement to this situation is provided in some embodiments of the present application. The method of any of the above embodiments may further include: disabling, in response to a stop instruction, the automatic movement of the tracking point along the boundary of the area to be tracked; receiving a movement instruction from the input device, the movement instruction including an indication of the direction of motion of the tracking point; and moving the tracking point to generate the trace line on the basis of the movement instruction.

The above steps may likewise be performed by the processor 116. The user can generate and send the stop instruction from the input device or any other devices according to the actual requirements. The processor 116, in response to the stop instruction, may disable the function of automatically moving the tracking point along the boundary of the area to be tracked. It should be understood that the disabled function is different from the stopping of automatic tracking, rather, the automatic tracking function will be switched to be temporarily disabled. Once the processor responds to the stop instruction, the first and/or second tracking instructions will no longer be sent. Further, the user is able to generate, by means of the input device, a movement instruction indicating the direction of motion of the tracking point. The movement instructions will have a directionality that can be directly mapped to the direction of motion of the tracking point. On the basis of the foregoing mapping relationship, the processor 116 can move the tracking point to generate the trace line. It should be understood that the tracking function of the present application will enter a manual state after the function of the processor 116 to control the tracking point to move forward/backward along the boundary according to the first/second tracking instruction is disabled by a stop instruction. The manual state provides the user with a high degree of freedom, allowing the user to control the direction of motion of the tracking point by manually giving the input device a directional input.

The foregoing configuration means allows the user to quickly and rapidly switch into a manual mode for trace line depiction in the face of less-than-accurate automatic boundary recognition or other unsatisfactory situations. The entire workflow is smooth and gradual, which can improve the accuracy of trace line depiction while retaining high efficiency.

The stop instruction can come from the input device as described above. In some embodiments, the stop instruction may come from the same input device that generated the first/second tracking instructions. In other embodiments, the stop instruction may come from any other input devices described above in the present application. For example, the user can generate the first/second tracking instruction by means of a trackball, and the user can also generate the stop instruction by means of the trackball. Alternatively, the user can generate the first/second tracking instruction by means of a trackball, while generating the stop instruction by means of a keyboard, for example, by pressing a particular key or any key on the keyboard. Examples are not exhaustively enumerated herein. When the above input devices are of the same type, the stop instruction is generated by the input device being operated in a third directional range. The third directional range may be arbitrary and may, for example, be different from the first and second directional ranges as described above. In addition, the third directional range can also be a specific means of operation, which is achieved by a specific operating gesture.

Figure 5:
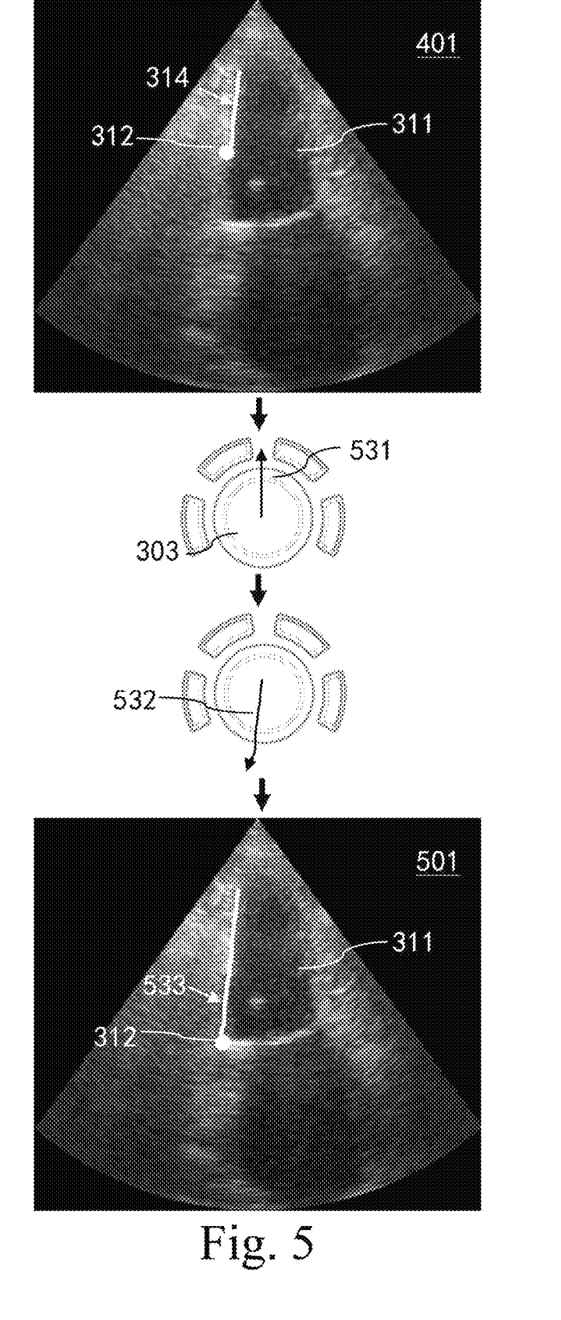
FIG. 5 is a schematic diagram for tracking an ultrasound image through movement instructions according to some embodiments of the present application.

Detailed descriptions are provided below with reference to the figures. Referring to FIG. 5, a schematic diagram for tracking an ultrasound image through movement instructions according to some embodiments of the present application is shown. The tracking of the ultrasound image 501 may be achieved by tracking by means of a movement instruction on the basis of the ultrasound image 401 of FIG. 4. However, the present application is not limited thereto and tracking by means of a movement instruction can be carried out at any step/stage of the embodiments as disclosed in the present application. In addition, in FIG. 5, the trackball 303 is used as an input device to input the stop instruction and movement instruction, but the present application is not limited thereto, and the foregoing input can also be achieved by any other input devices. The stop instruction may be generated by the trackball 303 being operated by the user in a third direction 531 (e.g., the upward direction as shown in the figure). At this point, the function of the processor to control the tracking point 312 to automatically move will be disabled. The movement of the tracking point 312 will be mapped to the movement of the trackball 303, i.e., into a manual trace line depiction mode. The user controls the movement of the tracking point 312 by controlling the movement path 532 of the trackball 303 to generate a movement instruction. The movement of the tracking point 312 further generates the trace line 533. It can be seen that there is a mapping relationship of the same shape between the movement path 532 and the trace line 533.

The foregoing configuration means solves the problem of low accuracy of automatic tracking affected by factors such as a low confidence level of the boundary which is automatically identified by the processor. Comparison of ultrasound images 402 and 501 shows that manual trace line depiction at the appropriate time of intervention has improved the accuracy of boundary tracking without unduly affecting the tracking efficiency.

In addition, the manner of moving the tracking point to generate the trace line on the basis of the movement instruction may be varied. In one example, the trace line can be continuously generated on the basis of the movement path of the tracking point. For example, referring to FIG. 5, the trace line 533 generated by the movement of the tracking point 312 may be identical in shape to the movement path 532 of the trackball 303. In another example, the trace line may also be generated by connecting an endpoint of the trace line and a dwell position of the tracking point. For example, with continued reference to FIG. 5, the generation of the trace line 533 may also be achieved by the processor connecting the endpoint 531 of the trace line to the dwell position 521 of the tracking point 312. It should be understood that the connection line between endpoint 531 and tracking point 312 can be smoothed by the processor, for example. In addition, there may be a plurality of dwell positions 521 of the tracking point 312. Multiple dwell positions can be generated by user operations, which ensures that the newly generated trace line is as smooth and accurate as possible.

In addition, it should be noted that the steps of any of the above embodiments of the present application may be displayed in real time by the processor sending signals to the display apparatus. For example, the ultrasound image is generated and sent to the display apparatus for display; and the initial position of the tracking point of the area to be tracked in the ultrasound image is determined and sent to the display apparatus for display. Similarly, the processor can control the display apparatus to display all the processing results related to ultrasound images in any of the above embodiments. The display apparatus can be in a wired, wireless or any other means of communication with the processor, which will not be further described herein.

Figure 6:
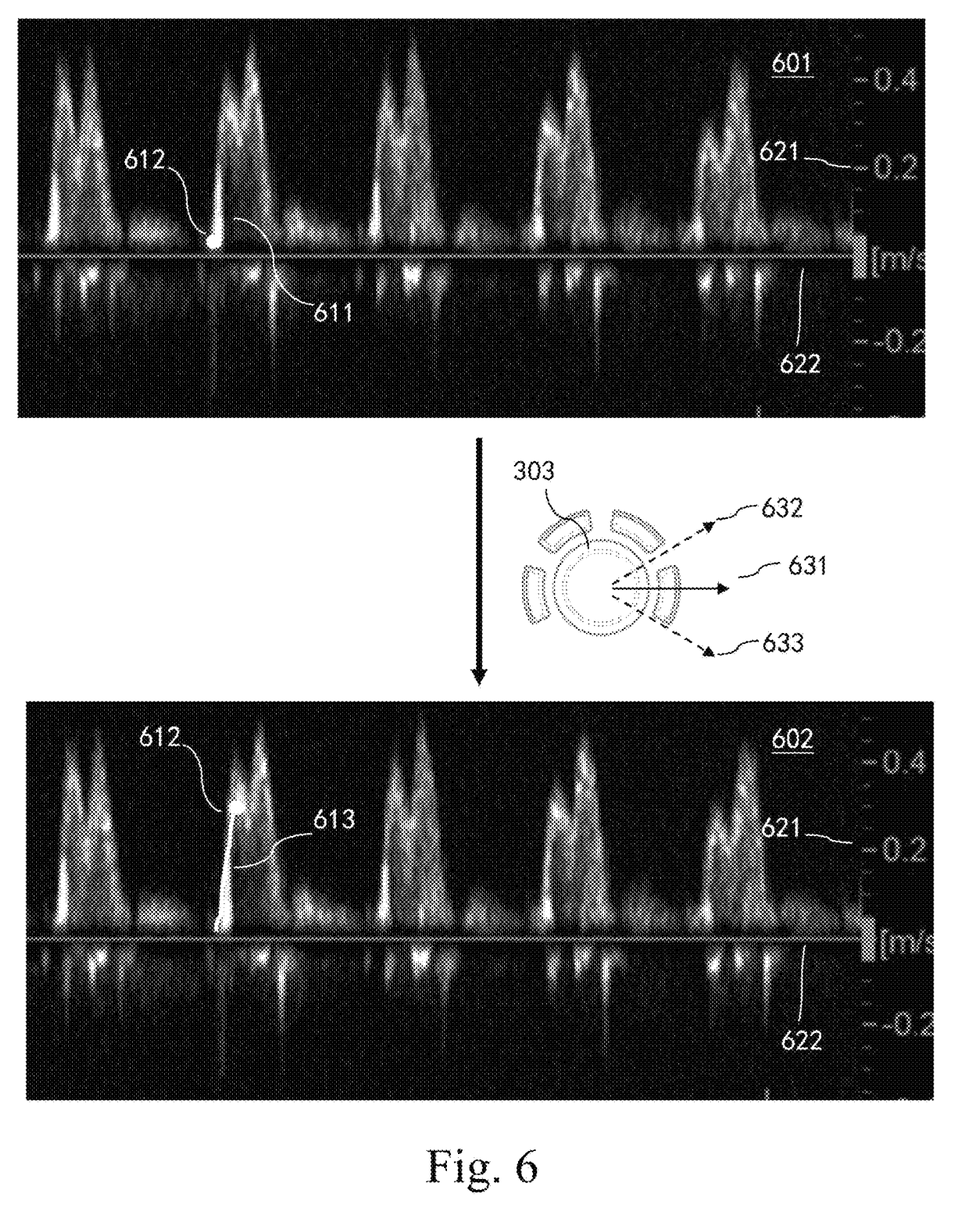
FIG. 6 is a schematic diagram for tracking an ultrasound image according to some other embodiments of the present application.

The area to be tracked to which the present application applies may include not only organs such as the heart and blood vessels, but also lesions such as tumors. However, the present application is not limited thereto, but can be applied to any ultrasound images where tracking is required. For example, it can be for the tracking of a Doppler spectrum. Referring to FIG. 6, a schematic diagram for tracking an ultrasound image according to some other embodiments of the present application is shown.

As shown in FIG. 6, the area to be tracked is a spectral waveform 611 generated in a pulsed Doppler imaging mode, rather than a specific anatomical structure. The spectral waveform 611 is drawn along a vertical axis 621 representing frequency (e.g., corresponding to velocity) and relative to time as represented by a horizontal axis 622. The processor can determine the direction of blood flow on the basis of the magnitude of the spectral waveform 611. For example, the portion of the spectral waveform 611 having a positive magnitude (e.g., located above the horizontal axis 622) indicates a blood flow movement corresponding to a certain velocity, moving toward and/or pointing toward the probe; while the portion of the spectral waveform 611 having a negative magnitude (e.g., located below the horizontal axis 622) indicates a blood flow movement corresponding to a certain velocity, moving away from the ultrasound probe and/or back away from the ultrasound probe. In addition, the processor may calculate a velocity time integral (VTI) on the basis of a selected spectral waveform (e.g., spectral waveform 611) to determine important physiological parameters of the person to be scanned. The calculation of VTI is usually carried out relying on the envelope formed by the spectral waveform. Therefore, it is essential to quickly and accurately depict the boundary of the spectral waveform 611.

In the present embodiment, the area to be tracked 611 is a spectral waveform. Firstly, the initial position of the tracking point 612 is determined. The determination means can be as described in any of the above embodiments, which may be automatically determined by a processor, or moved or adjusted by a user by means of operating the trackball 302, or can be automatically determined by the processor while further allowing the user to make manual adjustments.

After determining the initial position of the tracking point 612, the user can operate the trackball 303 in the first direction 331 or the first directional range 332-333 to depict the trace line, thereby forming the envelope. As the user continues to operate the trackball 303, the processor will continue to receive the tracking instruction to control the tracking point 612 to move along the automatically-determined boundary of the area to be tracked 611. The user does not need to adjust the direction when operating the trackball 303 (or other input devices) in accordance with changes in the direction of the boundary of the area to be tracked 611, but only needs to continuously operate the input device in generally one direction.

FIG. 6 illustrates only a partial depiction of the spectral waveform by a tracking instruction. It should be understood, however, the user can continue to operate the input device to complete the depiction of the entire envelope. In addition, the method of any of the above embodiments of the present application is equally applicable to the embodiment represented by FIG. 6. For example, when tracking the ultrasound image of FIG. 6, similar operations can be performed for trace line elimination, visual display of confidence levels, and switching of manual tracking, etc.

As can be seen through the various embodiments of FIGS. 2-6, the embodiments disclosed in the present application are applicable to a variety of different scenarios that require tracking and can provide an efficient and accurate tool for the acquisition of intermediate data for clinical purposes.

Some embodiments of the present application further provide an ultrasonic imaging system which may be as shown in FIG. 1 or any other. The system includes: a probe, configured to acquire signals for generating an ultrasound image; an input device, configured to be operated to generate an instruction; a processor configured to perform the method of any of the above embodiments; and further includes a display apparatus, configured to receive signals from the processor for display.

Some embodiments of the present application further provide a non-transitory computer-readable medium, wherein the non-transitory computer-readable medium stores a computer program, the computer program having at least one code segment which is executable by a machine so that the machine performs steps of the method in any of the embodiments described above.

Accordingly, the present disclosure may be implemented in the form of hardware, software, or a combination of hardware and software. The present disclosure may be implemented in at least one computer system in a centralized manner, or in a distributed manner in which different elements are distributed on a number of interconnected computer systems. Any type of computer system or other apparatus suitable for implementing the methods described herein are appropriate.

The various embodiments may also be embedded in a computer program product that includes all features capable of implementing the methods described herein, and the computer program product is capable of executing these methods when loaded into a computer system. The computer program in this context means any expression in any language, code, or symbol of an instruction set intended to enable a system having information processing capabilities to execute a specific function directly or after any or both of a) conversion into another language, code, or symbol; and b) duplication in a different material form.

The purpose of providing the above specific embodiments is to allow the content disclosed in the present application to be understood more thoroughly and comprehensively, but the present application is not limited to these specific embodiments. Those skilled in the art should understand that various modifications, equivalent replacements, and changes can also be made to the present application and should be included in the scope of protection of the present application as long as these changes do not depart from the spirit of the present application.

We claim:

1. An ultrasonic imaging method, comprising:
    generating an ultrasound image based on information obtained from a probe configured to acquire ultrasonic signals from a body part;
    determining, by a processor, an initial position of a tracking point of an area to be tracked in the ultrasound image, wherein the initial position is determined based on image recognition techniques that identify anatomical structures within the ultrasound image;
    receiving a first tracking instruction from an input device, wherein the first tracking instruction is generated by the input device being operated within a first directional range;
    obtaining a single direction corresponding to the first directional range;
    based on the single direction obtained from the input, automatically moving, by the processor, the tracking point in a plurality of dimensions along a boundary of the area to be tracked for the duration of the first tracking instruction to generate a trace line, wherein the movement of the tracking point is based on real-time analysis of the ultrasound image data;
    displaying, on a display apparatus, the ultrasound image with the generated trace line superimposed on the area to be tracked, and
    adjusting, by the processor, the trace line based on user input received after the trace line is generated to provide for manual correction of the automatically generated trace line.

2. The ultrasonic imaging method according to claim 1, wherein the determining the initial position of a tracking point of an area to be tracked in the ultrasound image comprises:
    automatically identifying a high confidence area within the boundary of the area to be tracked, and selecting, on the basis of the high confidence area, the initial position of the tracking point.

3. The ultrasonic imaging method according to claim 1, wherein the method further comprises:
    receiving a second tracking instruction from the input device; and
    automatically moving the tracking point along the generated trace line for the duration of the second tracking instruction to eliminate at least a portion of the trace line.

4. The ultrasonic imaging method according to claim 3, wherein
    the second tracking instruction is generated by the input device being operated within a second directional range.

5. The ultrasonic imaging method according to claim 4, wherein
    the first directional range is configured at least partially opposite to the second directional range, and the first directional range and the second directional range do not overlap.

6. The ultrasonic imaging method according to claim 1, wherein the method further comprises:
    disabling, in response to a stop instruction, the automatically moving the tracking point along the boundary of the area to be tracked;
    receiving a movement instruction from the input device, the movement instruction comprising an indication of the direction of motion of the tracking point; and
    moving, on the basis of the movement instruction, the tracking point to generate the trace line.

7. The ultrasonic imaging method according to claim 6, wherein
    the stop instruction comes from the input device, and the stop instruction is generated by the input device being operated within a third directional range.

8. The ultrasonic imaging method according to claim 6, wherein moving, based on the movement instruction, the tracking point to generate the trace line comprises:
    continuously generating the trace line based on a movement path of the tracking point; or connecting an endpoint of the trace line and a dwell position of the tracking point to generate the trace line.

9. The ultrasonic imaging method according of claim 1, wherein
the input device comprises at least one of a trackball, touchpad, touch screen, keyboard and mouse.

10. The ultrasonic imaging method according to claim 1, wherein the method further comprises:
automatically determining a confidence level of the boundary corresponding to the trace line and configuring, on the basis of the confidence level of the boundary, the trace line to have different visual display effects.

11. An ultrasonic imaging system, comprising:
a probe, configured to acquire a signal for generating an ultrasound image;
an input device, configured to be operated to generate an instruction;
a display apparatus; and
a processor, wherein the processor is configured to:
generate the ultrasound image based on information obtained from the probe;
determine an initial position of a tracking point of an area to be tracked in the ultrasound image, wherein the initial position is based on image recognition;
receive a first tracking instruction from the input device, wherein the first tracking instruction is generated by the input device being operated within a first directional range;
obtain a single direction corresponding to the first directional range;
based on the single direction obtained from the input, automatically move the tracking point in a plurality of dimensions along a boundary of the area to be tracked for the duration of the first tracking instruction to generate a trace line; and
display, on a display apparatus, the ultrasound image with the generated trace line superimposed on the area to be tracked,
wherein the movement of the tracking point is based on real-time analysis of the ultrasound image data, and
wherein the processor is further configured to adjust the trace line based on user input received after the trace line is generated to provide for manual correction of the automatically generated trace line.

12. The ultrasonic imaging system of claim 11, wherein the processor is configured to determine the initial position of the tracking point by automatically identifying a high confidence area within the boundary of the area to be tracked, and selecting, on the basis of the high confidence area, the initial position of the tracking point.

13. The ultrasonic imaging system of claim 11, wherein the processor is further configured to:
receive a second tracking instruction from the input device; and
automatically move the tracking point along the generated trace line for the duration of the second tracking instruction to eliminate at least a portion of the trace line.

14. The ultrasonic imaging system of claim 13, wherein the second tracking instruction is generated by the input device being operated within a second directional range.

15. The ultrasonic imaging system of claim 14, wherein the first directional range is configured at least partially opposite to the second directional range, and the first directional range and the second directional range do not overlap.

16. The ultrasonic imaging system of claim 11, wherein the processor is further configured to:
disable, in response to a stop instruction, the automatically moving the tracking point along the boundary of the area to be tracked;
receive a movement instruction from the input device, the movement instruction comprising an indication of the direction of motion of the tracking point; and
move, on the basis of the movement instruction, the tracking point to generate the trace line.

17. The ultrasonic imaging system of claim 16, wherein the stop instruction comes from the input device and the stop instruction is generated by the input device being operated within a third directional range.

18. A non-transitory computer-readable medium, wherein the non-transitory computer-readable medium stores a computer program, the computer program having at least one code segment which is executable by a machine to cause the machine to perform the steps of:
generating an ultrasound image based on information obtained from a probe configured to acquire ultrasonic signals from a body part;
determining an initial position of a tracking point of an area to be tracked in the ultrasound image, wherein the initial position is determined based on image recognition techniques that identify anatomical structures within the ultrasound image;
receiving a first tracking instruction from an input device, wherein the first tracking instruction is generated by the input device being operated within a first directional range;
obtaining a single direction corresponding to the first directional range; and
based on the single direction obtained from the input, automatically moving the tracking point in multiple dimensions along a boundary of the area to be tracked for the duration of the first tracking instruction to generate a trace line, wherein the movement of the tracking point is based on real-time analysis of the ultrasound image data;
displaying, on a display apparatus, the ultrasound image with the generated trace line superimposed on the area to be tracked, and
adjusting the trace line based on user input received after the trace line is generated to provide for manual correction of the automatically generated trace line.

* * * * *